P. L. WELLS AND F. W. HUNTER.
N. J. AND C. I. WELLS, ADMINISTRATORS OF P. L. WELLS, DEC'D.
AUTOMATIC FEED AND DELIVERY FOR PLATEN PRESSES.
APPLICATION FILED DEC. 16, 1907. RENEWED SEPT. 2, 1914.
1,363,200.
Patented Dec. 21, 1920.
8 SHEETS—SHEET 4.
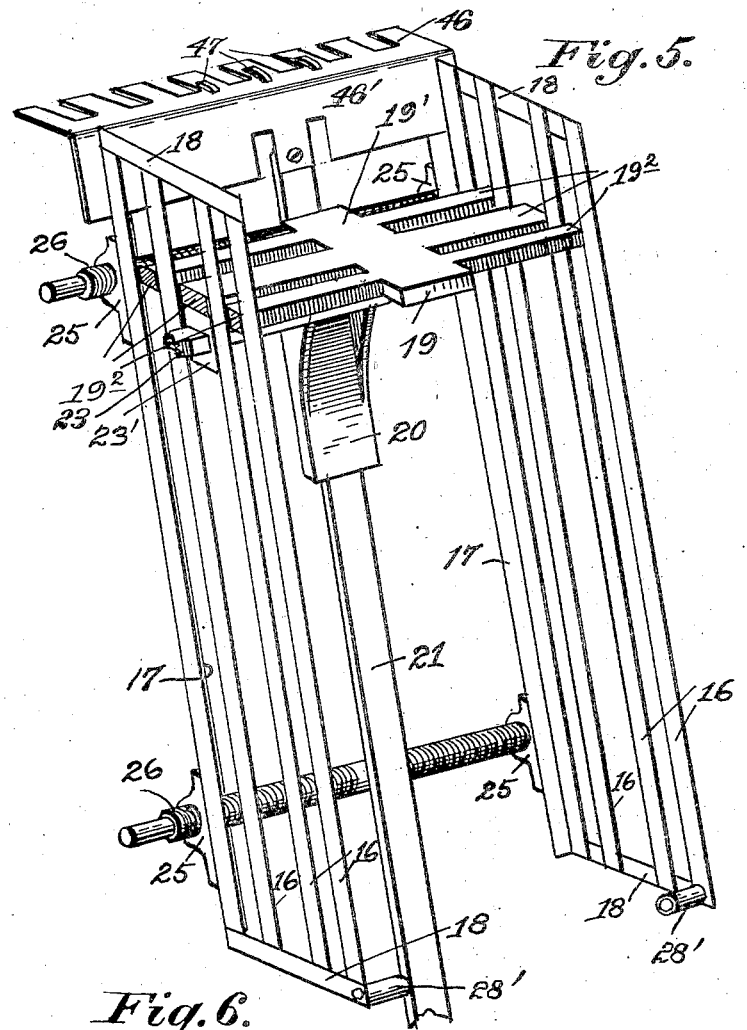
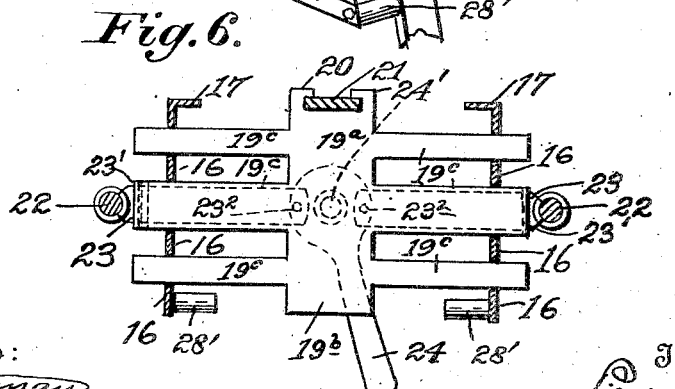

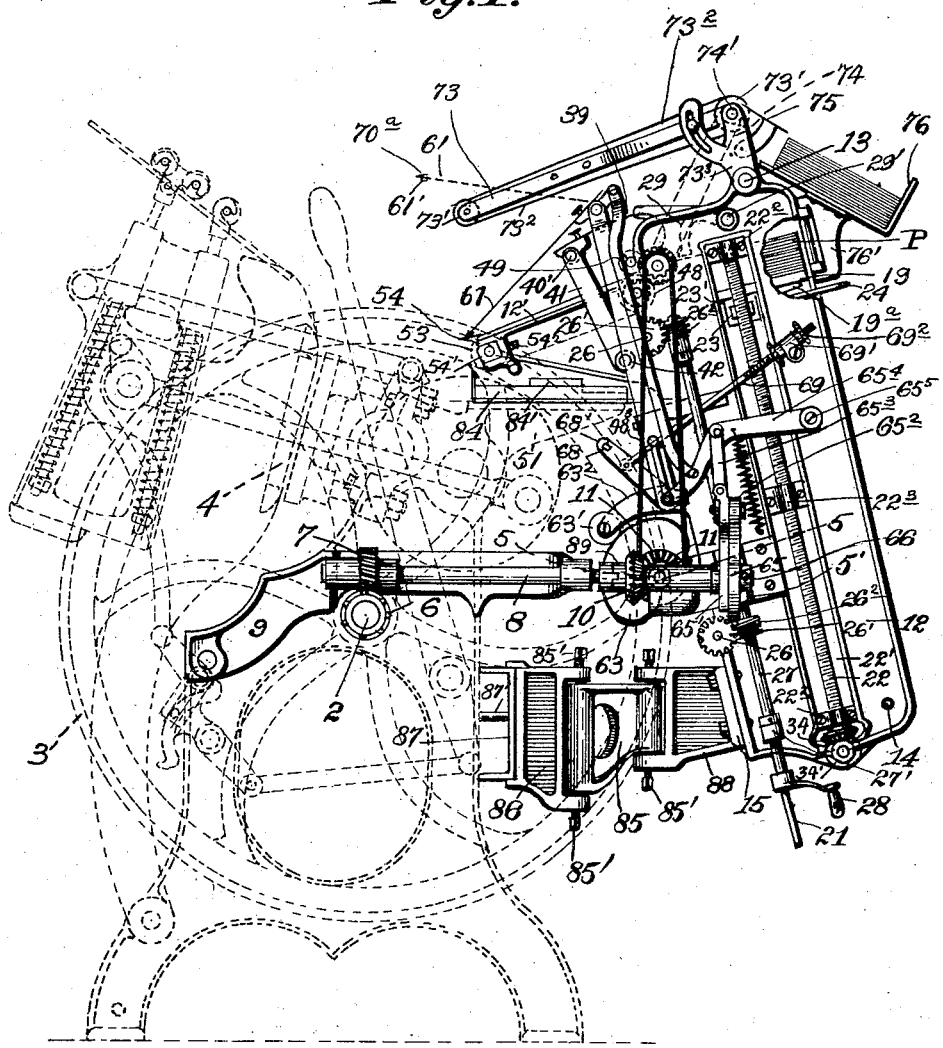

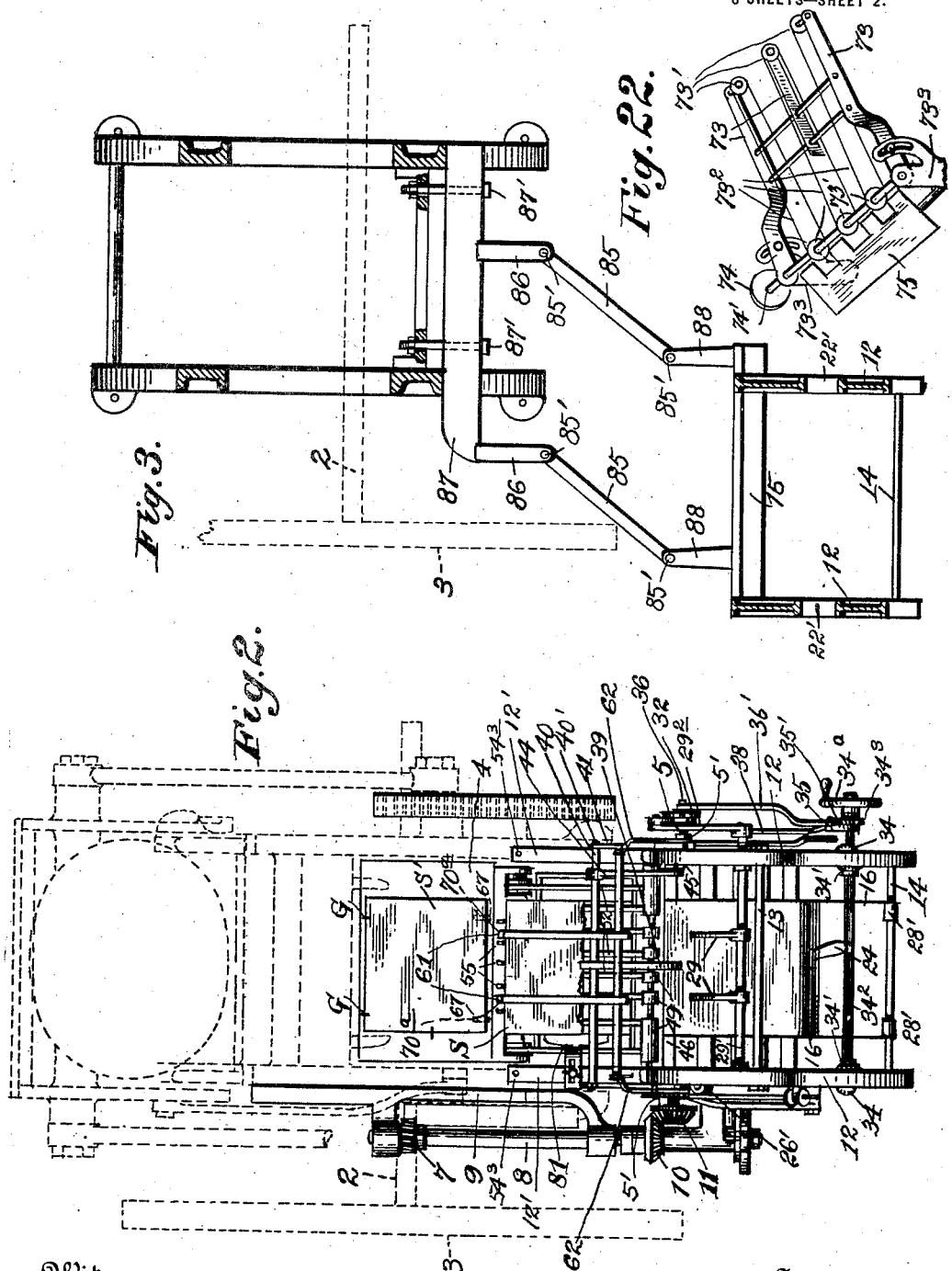

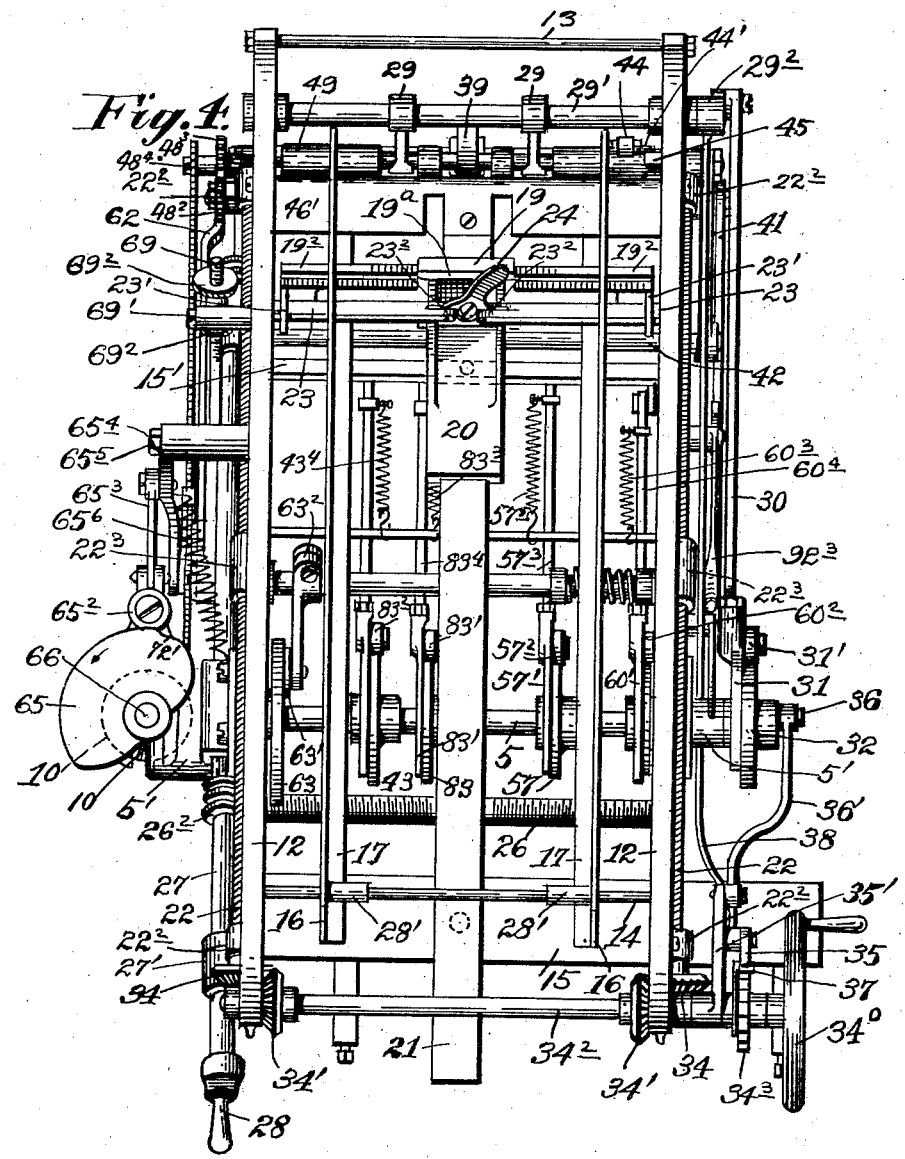

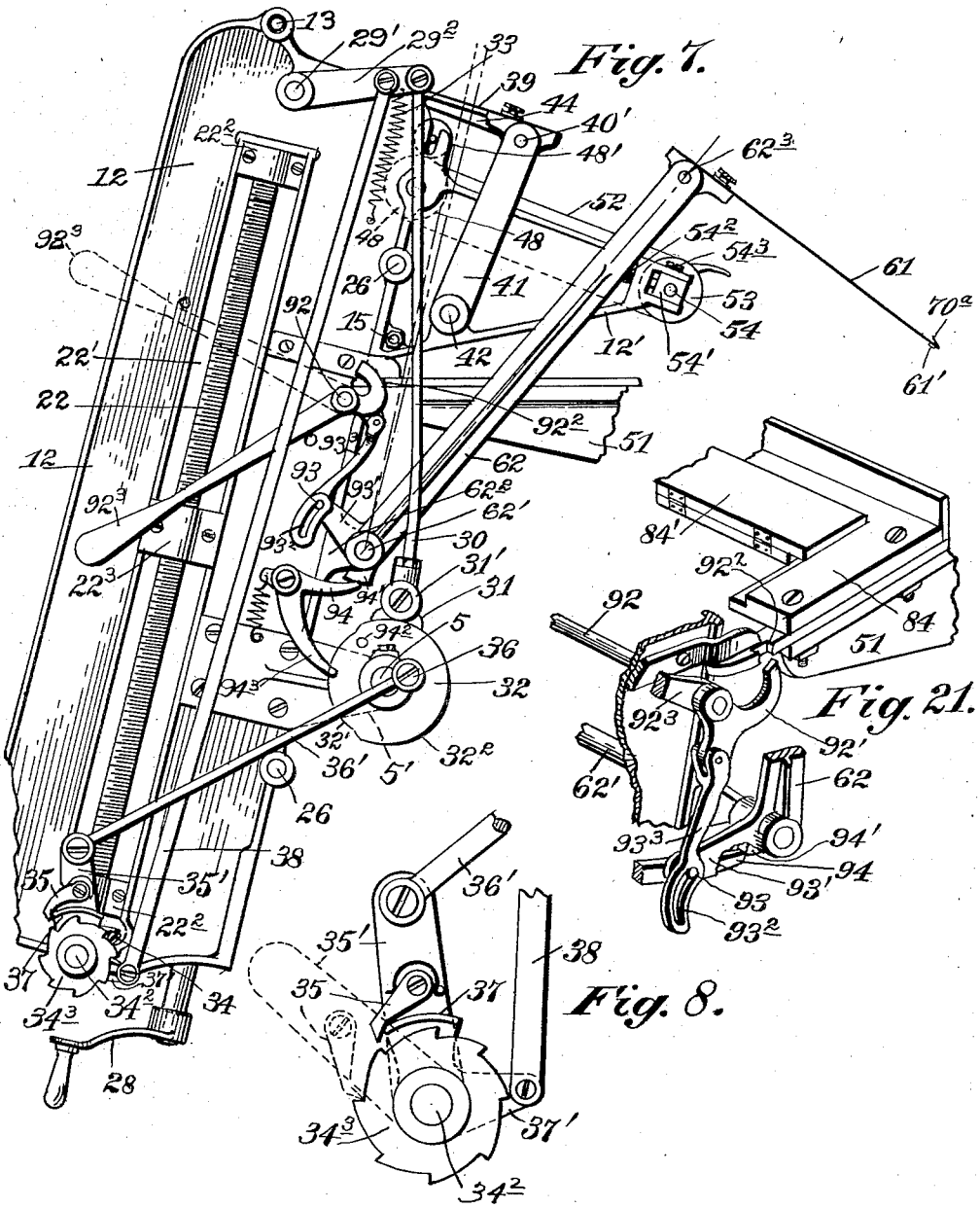

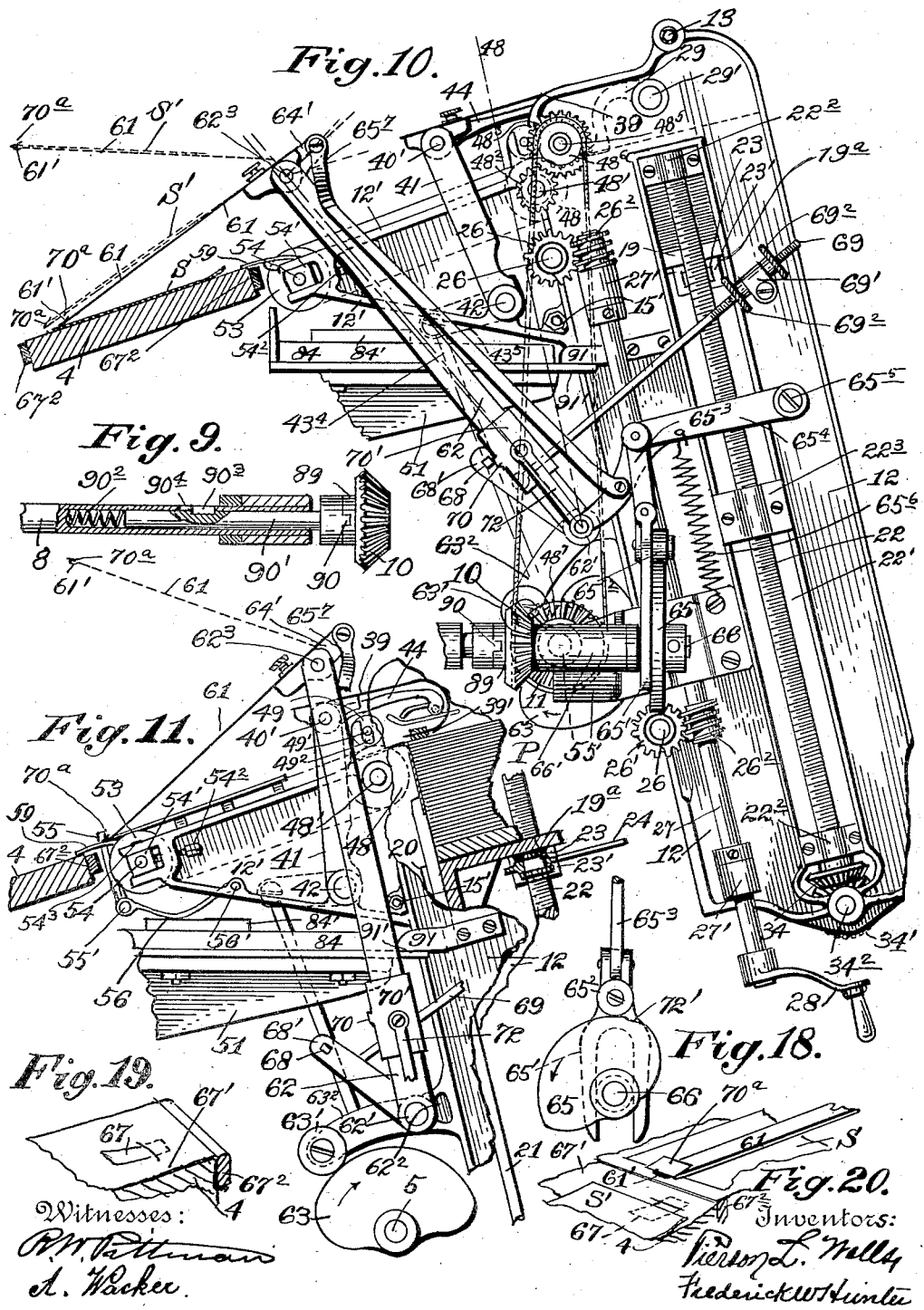

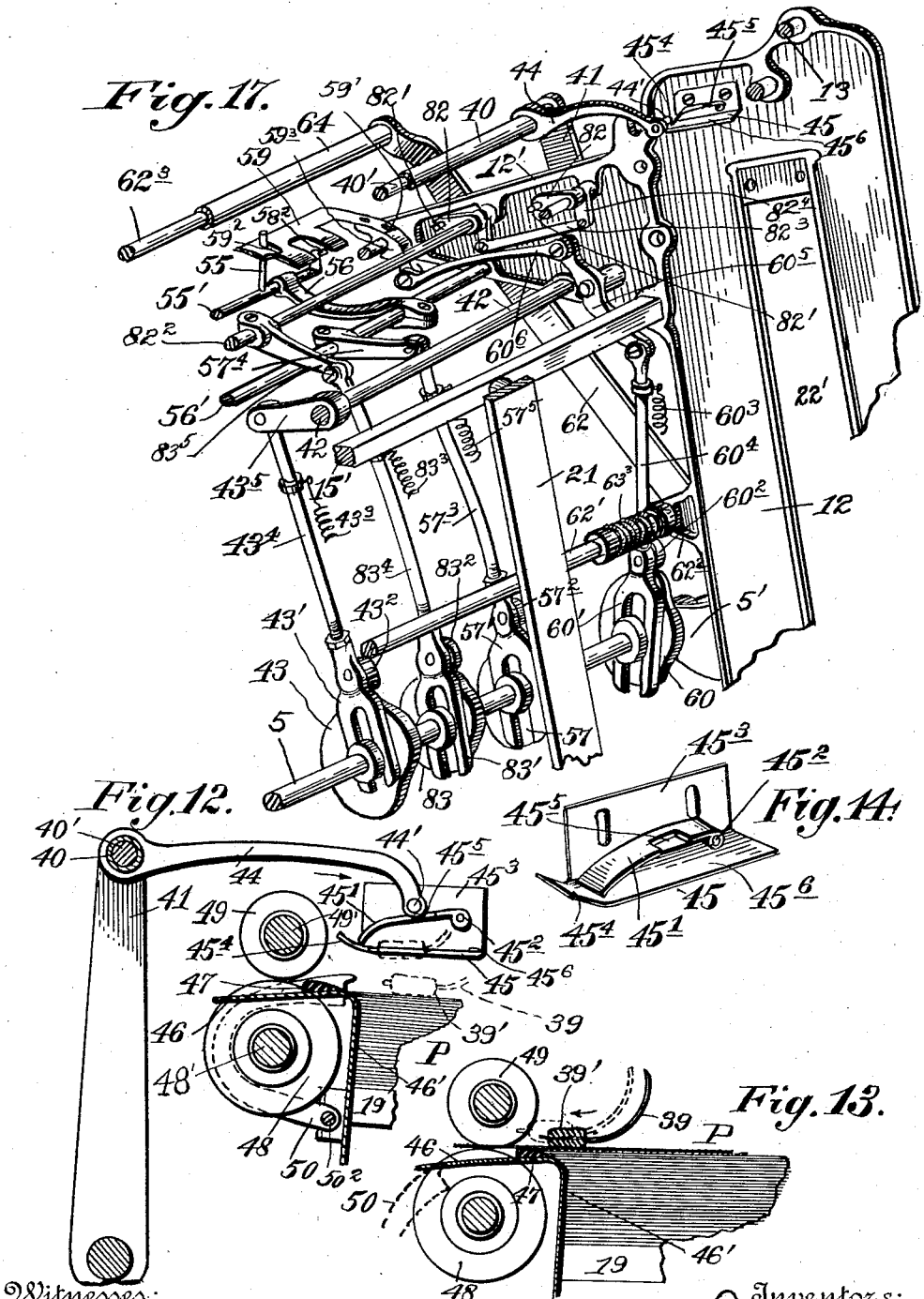

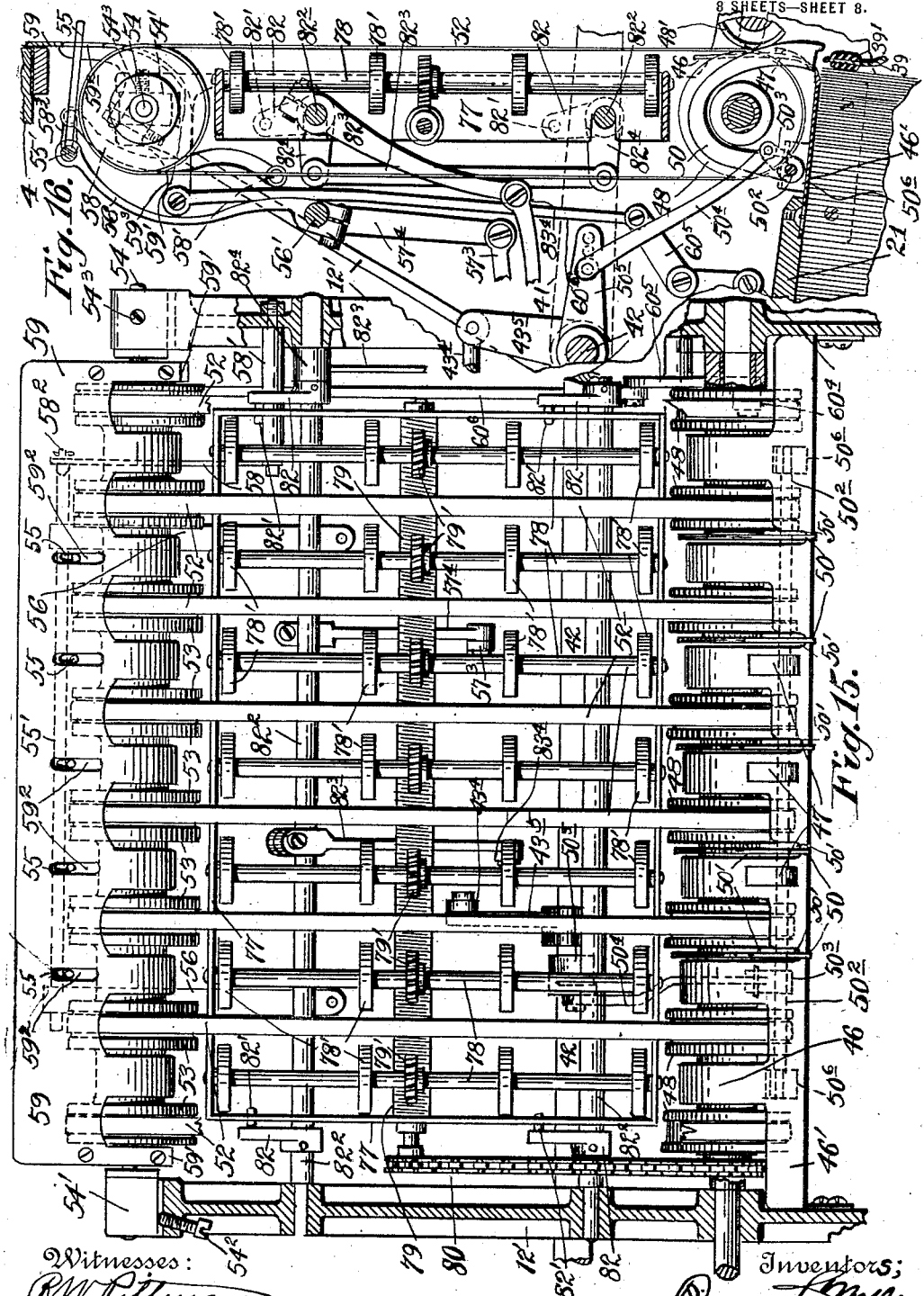

UNITED STATES PATENT OFFICE.

PIERSON L. WELLS AND FREDERICK W. HUNTER, OF BROOKLYN, NEW YORK; NETTIE J. WELLS, OF NEW YORK, N. Y., AND CHARLES I. WELLS, OF BROOKLYN, NEW YORK, ADMINISTRATORS OF SAID PIERSON L. WELLS, DECEASED; SAID ADMINISTRATORS AND SAID HUNTER ASSIGNORS TO MILLER SAW-TRIMMER COMPANY, OF PITTSBURGH, PENNSYLVANIA, A CORPORATION OF PENNSYLVANIA.

AUTOMATIC FEED AND DELIVERY FOR PLATEN-PRESSES.

1,363,200. Specification of Letters Patent. Patented Dec. 21, 1920.

Application filed December 16, 1907, Serial No. 406,803. Renewed September 2, 1914. Serial No. 859,917.

*To all whom it may concern:*

Be it known that we, PIERSON L. WELLS and FREDERICK W. HUNTER, citizens of the United States, and both of the borough of Brooklyn, city and State of New York, have invented a certain new and useful Improvement in Automatic Feed and Delivery for Platen-Presses, of which the following is a specification.

This invention embodies an apparatus for taking sheets of paper, or other objects to be printed, from a pile thereof, and placing them, one at a time, upon the platen of a press in proper position to be printed, and for removing each printed sheet from the platen and depositing it at a desired and convenient point contiguous to the press. Both these actions of placing the sheet to be printed and of removing the printed sheet proceed continuously and automatically during the running of the press and as long as there remains any blanks in the pile to be printed.

An apparatus made in accordance with the present invention includes means for taking a sheet, ordinarily from a pile thereof, (and by the term sheet in this specification we wish to include any object that has ordinarily been used for printing, or can be printed on a platen press and is susceptible of being transferred to position in the manner hereinafter set forth) and sliding it onto and over the tympan under the printed sheet to position against the gage pins thereon. The apparatus further includes means adapted to pass under the printed sheet, such means being conveniently included in the means used to pass the blank sheet over the tympan, and which former means being withdrawn carries with it the printed sheet to a point from whence it may be caused to pass to the place of deposition.

Moreover, the apparatus is preferably of such a character and construction that it is capable of ready attachment to various types of platen or so-called job presses. A further feature of construction, also present in the preferred form of the apparatus, enables constructive details of the feed and delivery mechanism to be readily shifted to a position in which the ordinary hand feed of the running press or its make-ready is not interfered with. Conversely, the constructive details of such mechanism can with equal facility be shifted back into operative position and timing with the press.

A further object of the invention is to provide an automatic feed and delivery adapted to feed and deliver practically anything within the capacity of the press to which it is applied, whatever its thinness or thickness, superficial dimensions or texture, the change from one character of sheet to another requiring a minimum of adjustment, readily understood and quickly made.

In the drawings accompanying the present specification, Figure 1 is a side elevation showing, in dotted outline, a platen or job press of the well known Gordon type with which has been combined an automatic feed and delivery embodying the features of the present improvements. Fig. 2 is a plan view thereof, the platen in this figure being in its open position instead of closed as in Fig. 1; the tape conveyer for removing the printed sheet from the retracted platen feed fingers and also certain other associated parts are omitted for the sake of clearness. Fig. 3 is partly a plan, partly a horizontal section illustrating the position assumed by parts of the supporting frame of the feed and delivery mechanism when the latter has been shifted out of operative relation with the press. Fig. 4 is a front elevation looking toward the inking disk of the press and shows the support, side guides, etc., for the pile of sheets, this figure and the remaining figures being upon a somewhat larger scale than the preceding figures. Fig. 5 is a perspective view of the pile support and shiftable side guides together with certain associated parts. Fig. 6 is partly a plan, partly a cross section of the reinforcing plate for the pile support, the side frames and the elevating screws and shows means for engaging the support with and disengaging it from the screws. Fig. 7 is a side elevation looking from the right in Fig. 4 and illustrates mechanism for automatically feeding the pile of sheets upward to maintain the upper surface of the pile at approximately the same height necessitated by the withdrawal of the successive sheets from the top of the pile. Fig. 8 is an enlarged detail of the feed ratchet, pawl, pawl lifter, etc. Fig. 9 is mainly a longitudinal section through the side shaft for transmitting motion from the driving shaft of the press to the driving shaft of the feed and delivery mechanism. Fig. 10 is a side elevation looking from the left in Fig. 4 and illustrates the sheet separating and feed or pile feed fingers, the platen feed fingers and various associated mechanism for actuating them, the parts being in their relative position with the platen feed fingers, still pressed against the blank sheet beneath, at the forward end of their stroke and which corresponds substantially to a similar position of the sheet separating and feed fingers, the latter fingers having delivered a fresh sheet to the feed rolls. Fig. 11 illustrates the upper portion of Fig. 10 with both sets of fingers at the rearward ends of their respective strokes, the platen feed fingers about to slide a blank sheet onto the tympan and the sheet separating and feed fingers approximately ready to remove a fresh sheet from the top of the pile. Fig. 12 is a detail view illustrating the sheet separating and feeding device, the sheet separating and feed finger being at a point in its rearward movement with the sheet engaging foot above the surface of the pile and the jogger fingers being in their rearward position. Fig. 13 illustrates a relative position of the sheet separating and feed fingers and the jogger fingers during the action of separating and feeding the top sheet of the pile. Fig. 14 is a perspective detail of the runaround for controlling the movement of the sheet separating and feed fingers. Fig. 15 is a plan view of the sheet forwarding and registering device. Fig. 16 is a side elevation of the same with the supporting side frame broken away to show the various shafts, levers, links, etc., contiguous to and concerned in the action of such device. Fig. 17 is a perspective view, part of the framing being broken away as well as the forwarding and registering device, etc., being removed, and indicates various operative parts and connections. Fig. 18 is a detail view of the cam, cam fork, etc., for operating the motion corrector of the platen feed fingers and for controlling the final forward movement of those fingers whereby the engagement of the printed sheet with the hooks or stops on said fingers is assured. Fig. 19 is a detail showing one of the bent paper tabs with which the platen is provided. Fig. 20 is also a detail showing one of the platen feed fingers in a position in which it is ready to feed forward a blank sheet onto the tympan, the printed sheet resting on the latter being also indicated. Fig. 21 is a perspective view illustrating means for locking the feed and delivery mechanism to the press and unlocking the same therefrom and assuring the withdrawal of the platen feed fingers to a position where they will not interfere with the running of the press. Fig. 22 is a perspective view illustrating the tape conveyer for removing the printed sheet from the platen feed fingers.

Similar characters of reference designate corresponding parts in all figures.

The present invention comprises means for removing sheets to be printed, one at a time, from a pile thereof, and sliding each sheet over a surface which constitutes a continuation of the tympan surface and onto the latter surface sometime after the impression action has ceased, the position of the sheet eventually approximating to or coinciding with its final printing position. The present feed and delivery further and additionally embraces means for sliding the sheet to position as aforesaid by an action which involves the passage of the sheet under the printed sheet brought back with the platen in its opening movement. The removal of this printed sheet begins, in the present embodiment of the invention, at some time subsequent to the placing of the blank sheet in position on the tympan.

While the present feeder and delivery is illustrated in the drawings as applied to a platen or so-called job press of the common hand fed Gordon type, it is to be understood that the invention can also be readily adapted to the automatic feeding and delivery of presses of other types, or it may be made a constituent part of a press and provided for in the manufacture of the latter.

When applied to an existing press, the power for actuating the feed and delivery is usually derived from the power shaft of the press and support afforded by the framework of the press. It being essential that the feed and delivery be in proper timing with the press movements we may, as in this embodiment, where a separate driving shaft for the feed and delivery mechanism is provided give thereto a single rotation for each full movement of the press platen, interposing suitable gearing between the aforesaid driving shaft and the driving or power shaft of the press to accomplish this.

Proceeding now to a detail description of the various features of the invention as illustrated in an embodiment thereof applied to a Gordon press, 2 designates the power or driving shaft of the latter provided with the usual fly wheel 3 while the press platen is designated by 4.

The driving shaft of the feed and delivery mechanism is designated by 5 journaled in suitable bearings 5', 5', and which, as here designed, is disposed parallel to shaft 2 when the aforesaid mechanism is in its operative position and has one complete rotation for each full cycle of motion and dwell of the platen. This result is here accomplished through the medium of a pair of spiral gears, or a worm and worm wheel, one of which 6 is secured to the shaft 2, its meshing gear 7 being secured to a side shaft 8 mounted in bearings supported by a frame piece 9 affixed to the frame of the press. Shaft 8 is adapted to drive a bevel gear 10 engaging with a bevel gear 11 secured to the aforesaid driving shaft 5.

One of the elements embraced in the present invention is a device for taking sheets successively from a pile thereof and feeding them to a position from which they may be passed onto the tympan. Any particular construction or mode of operation of such device is not essential to the present invention provided it accomplishes the result aforesaid. We therefore wish it understood that we are at liberty to utilize any appropriate type or character of paper feed mechanism.

One form of such device is illustrated in the drawings, the same comprising a top-feed, sheet separating and feeding mechanism with an automatically operative elevator.

Before however, proceeding to a detail description of such mechanism, it may be premised that for convenience in supporting various shafts, levers, and other parts, we have indicated a pair of side frames 12, 12, spaced a distance apart somewhat greater than the greatest width of sheet which the particular press to which the invention is applied is designed to print. Tie rods 13, 14 and tie bar 15, 15' hold the frames rigidly together. It is within the space between the frames that the elevator for the pile of sheets is located.

Specifically, the elevator and sheet separating and feed mechanisms include a pair of side guides, see Figs. 5 and 6, each constructed of upright bars 16 and each having an inner upright angle bar 17 against which the inner edge of the pile rests. Each set of bars 16, 17, is tied together by upper and lower cross pieces 18, 18. The support on which the pile rests is designated by 19; it is plate-like in form and comprises a central part 19', whose width may be substantially equal to the length of the smallest sheet which it is contemplated that the press shall print, and oppositely extending projections $19^2$. The over-all dimensions of the pile support measured from the extreme end of one projection $19^2$ to the extreme end of the opposite projection $19^2$ may be substantially equal to the length of the largest sheet which the press is adapted to print, while said projections are disposed opposite to and are in width somewhat less than the width of the spaces between the guide bars 16, 17.

As here designed plate 19 with which the bottom sheet of the pile contacts is secured to a reinforcing plate $19^a$ beneath having the same general configuration of central part 19' and projections $19^c$ as the plate already described. From plate $19^a$ extends a dependent guide 20 which fits and is adapted to travel lengthwise of a guide bar 21.

Elevating screws 22 are indicated (one right handed and one left handed in this instance) one extending lengthwise of a longitudinal opening 22' in one side frame 12 and similarly as to the other frame. Each screw rotates in suitable end bearings $22^2$ while an outboard bearing $22^3$ for each screw prevents its springing laterally when in operation.

Preferably the construction is such that pile support 19 may be manually disengaged from the elevating screws, shifted up or down to the desired point and reëngaged therewith. The means here indicated for the purpose comprise slide bars 23, 23, each having a thread section or its equivalent at its outer end, adapted to engage with the thread of the contiguous elevating screw, and slidable to and fro through a guide opening in a dependent flange 23' of plate $19^a$. The inner ends of these slide bars are pivoted by pins $23^2$, $23^2$, togglewise to a hand lever 24 fulcrumed by pin 24' to plate $19^c$. It is evident that in Fig. 6 the slide bars are locked in engagement with the elevating screws and that if lever 24 is turned to the left, the bars being drawn inward, the pile support may be shifted to any position along the guide bar 21 and operatively reëngaged with the screws.

The side guides comprising the bars 16, 17, are ordinarily adjustable toward and away from each other to conform, at least approximately to the corresponding dimension of the sheets of the pile with which the press may be stocked. In this instance the two guides are made adjustable simultaneously toward and away from each other, although not necessarily so. That is to say, each such guide is here provided with an upper and a lower nut 25, those on one guide being right handed, those on the other left handed. Engaging with each pair of oppositely threaded nuts is a correspondingly threaded screw 26 both screws being capable of simultaneous rotation through the medium of a worm wheel 26' on each shaft 26 which meshes with a corresponding worm $26^2$ on a shaft 27 moutned in bearings 27' on a side frame 12 and provided with a convenient hand crank 28. A guiding sleeve 28' rigid with each side guide encircles tie rod 14.

Coming now to a detail description of the means illustrated for automatically elevating the pile of sheets as the latter are withdrawn thus maintaining the upper surface of the pile at approximately the same point, that is within a practical limit of variation, there is indicated an arm 29 (one or more) secured to a shaft 29' journaled in the side frames 12, 12 and adapted by the turning of that shaft to be brought in contact with the upper surface of the pile or withdrawn therefrom. Extending from shaft 29' is an actuating lever $29^2$, to which one end of a link 30 is pivoted, the opposite end of the link being secured to a cam fork 31 carrying a cam roll 31' held in contact with a cam 32 on driving shaft 5 by a spring 33.

Secured to each elevating screw 22 is a bevel gear 34 meshing with a corresponding gear 34' on a cross shaft $34^2$ journaled in the lower ends of side frames 12, 12. It may be provided with a hand wheel $34^0$. Shaft $34^2$ also carries at one end a ratchet wheel $34^3$ with the teeth of which is adapted to engage a spring-pressed pawl 35 carried by a rocker arm 35' which in turn is actuated by means such as a crank pin 36 on shaft 5, a connecting link 36' being interposed as shown. A pawl shifter 37 is indicated as adapted to vibrate in a path in which it may become operative or inoperative to withhold the pawl from engagement with the ratchet teeth during the rocking of arm 35'. The pawl shifter is here pivoted concentrically with arm 35' and an extension 37' of the body part of the shifter is connected by a link 38 with lever $29^2$. It will be noted further that cam 32 embodies two substantially arc-shaped portions one 32' of less radius than the other $32^2$. The parts are so proportioned and adjusted and the timing is such that when roll 31' is on the part $32^2$ of the cam, arm 29 is raised clear of the pile of sheets and the top sheet is free to be separated from and shifted off the pile. When, however, the cam roll drops off part $32^2$, and arm 29 rests upon the pile, one of two conditions may exist; the upper surface is substantially in the right plane for the designed action of the sheet separating and feeding means or it is below that plane and the pile should be fed upward. The former condition prevailing, pawl shifter 37 is so located as to hold the pawl out of engagement with the teeth of ratchet wheel $34^3$ during the forward excursion of rocker arm 35'. Under the latter condition, however, the pawl shifter is far enough to the right in Fig. 8 to permit the pawl to engage with the ratchet teeth and thereby turn shaft $34^2$ and elevating screws 22, 22 during the forward excursion of the rocker arm. An upward feed of the pile results sufficient to position the top sheet for separation and removal by mechanism now to be described.

Introductory to such description, it should be stated, that it is contemplated the scope of the present automatic feed and delivery shall be ordinarily practically the same as the press, or in other words that the mechanical embodiment of the invention shall be capable of feeding and delivering practically anything the press is capable of printing whatever the superficial dimensions of the sheet, its texture or its thickness—a result, moreover, attainable by a minimum of simple adjustment. The sheet separating and feeding mechanism is, therefore, ordinarily, one fitted alike to function with thick or thin, light or heavy sheets.

The particular type of such mechanism here adopted for fulfilling the conditions aforesaid embraces a sheet engager adapted to exert sufficient friction on the sheet to shift the latter when the engager is actuated, or to actually penetrate the substance thereof as by points, serrations, or sharp metallic edges. When the sheet feeding means is of the type illustrated and particularized, a sheet retarder for restraining the movement of all sheets save the one on which the sheet engager presses will also ordinarily be used.

Proceeding now to a description of the specific mechanism illustrated, 39 designated a sheet engager or pile feed finger (one or more) having a sheet engager part 39' of rubber, sand-paper, etc., adapted to press against and engage with the upper sheet of the pile P, see Fig. 11. Finger 39 is rigidly securable to a sleeve 40 see Fig. 17, loosely mounted on a tie rod 40' connecting the upper ends of rock arms 41, 41, extending from a rock shaft 42 journaled in forward extensions 12', 12', of the side frames 12, 12. A cam 43 on the driving shaft 5, with its usual cam fork 43', cam roll $43^2$ and returning spring $43^3$ serves to actuate shaft 42 through a connecting link $43^4$ pivoted at its upper end to an arm $43^5$ of the shaft. Sleeve 40 is thus given a lateral forward and backward movement while its axial rocking to maintain the sheet engager in engagement with the sheet during the forward lateral movement of the shaft and inclosing sleeve, its rise therefrom as it reaches the forward extremity of its movement, its backward travel above and clear of the pile, and its descent on the fresh upper sheet thereof, is governed by a motion controller consisting of an arm 44, rigid with sleeve 40 and having a projecting pin 44', and a runaround 45 with which pin 44' is adapted to coöperate. This runaround embodies a weighted track flange 45' pivotally mounted at 45² on a plate 45³ for the attachment of the runaround to one of the side frames 12. At the forward end there is an upwardly extending lip 45⁴ which, when pin 44' comes in contact with it during the forward travel raises the sheet engager from the sheet. Thereafter, track 45' which has previously been rocked upward by the pin, drops back. The pin on its backward movement now rides on the track above its position for forward movement until it approximates its extreme rearward position whereupon it drops through an opening 45⁵ and the sheet engager again rests upon the pile, with the pin 44' above a safety track 45⁶ which precludes the descent of the sheet engager beyond the vertical range within which it properly functions. Ordinarily the overbalanced weight of the parts suffices to hold the engager with sufficient firmness against the sheet to cause its movement therewith.

One or more sheets are thus slid forward onto a platform 46 which connects by a rounding edge with a stop plate 46' for the upper end of the pile. In order to assure the movement of but a single sheet by the pile feed finger during the last portion of its travel, a sheet retarder is disclosed embodying a friction surface such as that of a rubber block 47 (one or more) extending somewhat above the surface of the platform. This retarder exerts sufficient friction upon all the moving sheets, by reason of the pressure of the sheet engager to arrest the movement of all save the uppermost sheet which alone continues its movement since it is designed that the forwardly urging force exerted by the sheet engager shall be in excess of the frictionally retarding force between the sheet and the sheet retarder. The forward movement of the pile feed finger is sufficient to carry the edge of the underlying sheet into the bite of lower and upper sets of gripper rolls, the former set 48 being mounted on a shaft 48' journaled in the side frames 12, 12 and suitably rotated, as by step-up meshing gears 48², 48³, gear 48² being secured to said shaft and gear 48³ being mounted on a sleeve 48⁴ journaled on a stud 48⁵ on the side frame, see Fig. 10. This sleeve may be rotated by sprocket chain drive comprising a sprocket 48⁶ on the stud, as sprocket 48⁷ rigid with driving shaft 5 and an engaging chain 48⁸.

The upper set of gripper rolls 49 is shown as a gravity roll the same being secured to a shaft 49' slidably mounted in slots 49² of the side frames 12, 12.

It is to be noted that the underlying sheets started by the sheet engager and left in engagement with the sheet retarder upon the completion of the forward movement of the engager or pile feed arm, lap over upon and cover the retarder more or less. If therefore each sheet were started forward from the position in which it was previously left on the retarder, the latter would in a short time be completely covered over and therefore improperly function or fail to function at all to prevent the complete forward movement of but a single sheet. It is therefore advisable to return all shifted and retarded sheets to approximately the same starting position before the sheet engager is again moved forward. For this purpose a set of jogger fingers 50 may be used working in slots 50' in the platform 46 and shiftable from a position in which their ends (having a width in such position measured up and down of the pile somewhat greater than the aggregate thickness of the sheets likely to be started by the forwardly moving sheet engager) are approximately in line with the pile stop 46' to a position in which they are out of the path of the moving sheet. This jogging movement (toward the pile) takes place when the sheet engager is free of the pile while it is shifted forward out of the way of the moving sheet in time to avoid all inference therewith. It may for instance move back and forth in unison with the sheet engager and at the same rate of speed as the latter. This is the case in the present embodiment in which the jogger fingers are additionally shown as capable of rocking from one of the aforesaid positions to the other, they being further indicated as curved and connected to a rock shaft 50² having an arm 50³ connected by a link 50⁴ with an arm 50⁵ on the aforesaid rock shaft 42; proper lengths of lever arms will give the proper travel of the fingers while shaft 50² may be journaled in brackets 50⁶ on the inner side of pile stop 46'.

It is also to be noted that looking from the side of the press at the pile on the elevator it is somewhat inclined to the vertical necessitating during the jogging movement a somewhat upward movement of the sheet. It is contemplated that this action against gravity will eliminate the necessity for a back stop to prevent the over-running of the sheets under the action of the jogger.

In those instances in which the pile elevator is located a considerable distance from the platen (it being in the particular case situated at the outer ends of the usual table brackets 51 commonly provided as a part of the framework of this press) a forwarder is necessary for continuing the movement of the sheet toward the platen after the sheet engager has been withdrawn. For this purpose there is utilized in this instance, the aforesaid sets of gripper rolls 48, 49 and a tape conveyer embodying tapes 52 running over, and driven by, the driven rolls 48 and forward rolls 53 mounted on a shaft 54 journaled in suitable bearings, here provided in boxes 54' adjustably mounted in the frame extensions 12' and backed by setting up screws 54². Box clamping screws 54³ are also indicated.

Assuming that a sheet has been delivered by the aforesaid gripper rolls 48, 49 to tapes 52, the latter carry the sheet forward until its forward edge impinges against a suitable stop hereafter described tending to aline the sheet edge with the stop surface, and thus correcting any angular irregularity which the sheet may have when passed onto the tapes.

The stop employed in the present apparatus for holding the sheet against the friction of the running tapes comprises a series of stop pins 55 whose stop faces are disposed in a line parallel to the direction of the lower edge of the sheet when in its final registered or printing position against the usual lower gage pins on the tympan.

While the aforesaid stop pins are in their operative position prior to the time that the moving sheet is likely to be brought against their stop faces by the traveling tapes and so remain until after the platen feed fingers engage with it, it is necessary that the stop fingers thereafter be shifted out of the path of the sheet just before it starts on its final movement toward the tympan. The means at present adopted for effecting this timed shifting movement of the stop fingers comprises a cross bar 55' from which said fingers extend rigid with the bar. This latter is carried by suitable rock arms 56, 56, secured to a rock shaft 56' mounted in the side frame extensions 12' and actuated by a cam 57 on the driving shaft 5 through a suitable connection here comprising a cam form 57', cam roll 57², link 57³, arm 57⁴ extending from rock shaft 56', and returning spring 57⁵.

Since the stop pins 55 are located close to the upper edge of the platen when the latter is in its open position it is desirable to render their displacement toward and away from the platen during their movement from operative to inoperative position, and vice versa, comparatively small; cross bar 55' may therefore be rotatably mounted in the rock arms 56 and connected to a motion controller in the nature of a vibrating arm 58 journaled at one end to a stud 58' extending from a side frame extension 12' and at the other end to a crank pin 58² of the cross bar 55', the proportion and relation being preferably such that the stop pins have a slight forward motion when moving downward to inoperative position.

One of the essential features of the present invention involves the sliding of the blank sheet to be printed on to the tympan and to its printing position, some time after the impression action of the press has ceased, this sliding of the sheet commencing early enough to permit the placing of the sheet against the tympan gage pins before the next closing or impression movement of the press. In order to thus move the sheet onto the tympan it is moved from a surface which at least at the time of the passage of the sheet onto the tympan constitutes, substantially a continuation of the tympan surface.

With respect to the time at which that movement of the sheet is begun which passes it onto the tympan, we have found that if, when the invention is applied, as in this instance, to a press having the so-called "Gordon" movement, the sheet-to-tympan movement is commenced when the platen approximately reaches the commencement of its "dwell" period, ample time will ensue before the platen starts to close (within the usual speed capacity of such presses) to place the sheet approximately if not practically true in its printing position and also to withdraw the sheet moving means from the region between the platen and the form. The aforesaid surface may be under these conditions, that afforded by a hinged leaf or plate whose free edge extends over in close proximity to if not in actual contact with the upper edge of the tympan when the platen comes to rest for its dwell period, this leaf being tilted to clear the platen some time prior to the beginning of the return movement of the platen.

That is to say, as here organized, a plate or leaf 59 is provided with suitable bearing pieces 59' by which it is journaled on the shaft 54, in a position such that the forward edge of a sheet on tapes 52 will be passed thereonto and over it until the sheet is arrested by stop pins 55 which work through suitable openings 59² in the leaf. The free edge portion of the leaf, preferably tapering at its longitudinal extremity, extends somewhat over the upper edge of the platen when in its "dwell" position; when the leaf is rocked upward, the platen is free to move forward on its impression movement.

This rocking motion of the leaf may be rendered positive and certain in the manner disclosed according to which an arm 59³ rigid with the leaf is rocked by a cam 60 through an intervening cam fork 60', cam roll 60², returning spring 60³, link 60⁴, bell crank 60⁵, and link 60⁶.

For the purpose of sliding the sheet held by the stop pins 55 onto the tympan we employ a suitable number of platen feed fingers, designated by 61, each having a sheet-engaging foot or end piece 61' of a nature which will be understood from the description already given with reference to the sheet engagers on pile feed fingers 39. The sheet engagers on the former fingers prior to the forward movement of the fingers are caused to impinge against the edge portion of the sheet held by stop pins 55 after which the latter are withdrawn as will be readily understood.

Assuming now that the platen is about or has actually taken its position of rest or dwell and that leaf 59 has been rocked down on the tympan, the platen feed fingers move forward maintaining sufficient pressure upon the sheet underneath their sheet engagers to slide the sheet over the surface of the tympan without slipping on the sheet or disengaging therefrom until the sheet has reached its printing position against the lower tympan gage pins. Thereafter, and before the platen starts to close, the fingers swing upward and are carried backward to their original position to engage with a fresh sheet which has meanwhile been brought in contact with the raised stop pins 55.

One mechanism devised for accomplishing such a result is illustrated. It comprises a pair of side arms 62 without the side frame extensions 12', 12' and adapted to vibrate on the outside of the press brackets 51. At their lower ends they are secured to a rock shaft 62' journaled in bosses 62² of the side frames 12, 12, while their upper ends are rigidly connected by a tie cross bar 62³. These parts are vibrated to and fro by a cam 63 and an associated cam roll 63' roll arm 63² rigid with rock shaft 62' and returning spring 63³.

Platen feed fingers 61 are secured to a sleeve 64, they being preferably adjustable therealong, and in order to cause the sheet engagers on the platen feed fingers to move in a substantially straight line parallel to the tympan surface but pressed downwardly thereon, during the forward excursion of the side arms 62, a motion corrector or rectifier is employed consisting of an arm 64' extending from sleeve 64 and properly actuated to give the result aforesaid from a cam 65 and intervening devices embodying a cam fork 65' cam roll 65² link 65³ connecting the fork to a lever 65⁴ pivoted to stud 65⁵ on a side frame 12, returning spring 65⁶, and link 65⁷. Cam 65 is here affixed to a short shaft 66 rigid with the aforesaid bevel gear 10 and journaled in a bearing 66' on the side frame as indicated.

Since, in the present application of the invention, the removal of the printed sheet brought back with the platen when it comes to its stop position, is not contemplated until after the blank sheet starts toward and onto the tympan, such blank sheet will slide over the tympan to position thereon under the printed sheet. In order to insure its entrance under the upper edge of the latter means are ordinarily used for holding such edge somewhat off the surface of tympan, such means necessarily being of character not to interfere with a proper impression. We have found that a suitable number of curved or bent paper tabs 67, see Fig. 19, apparently fulfil every practical requirement. These tabs are inserted through proper slits in the tympan sheet 67', held by the usual bails 67², one being indicated, and held in place by adhesive with their free spring-like ends pointing toward the lower edge of the platen. Their location for each job to be run off on the press is such as to hold the upper edge of the sheet slightly elevated when the sheet is free from the pressure of the form, as indicated in Fig. 20.

One of the features involved in the use of the present apparatus is its adaptability to the ordinary method of "make ready" in which good practice demands the more or less particular location of the sheet on the tympan to secure a proper pressure distribution and a consequent uniform impression. As a general rule, therefore, the position of the lower tympan gage pins will vary with each job.

Means are herein provided for causing the driving action of the platen sheet engagers on the sheet to cease the instant the forward edge of the sheet encounters the set lower gage pins, the sheet and gage pins being designated by S and G, respectivly, in Fig. 2. This cessation of driving action here results from the arrest of the forward motion of the rock arms 62, etc., by means of a stop 68 extending from an arm 68', mounted concentrically with rock shaft 62' and manually adjustable for instance to the proper position aforesaid by means of a threaded rod 69 which passes loosely through an opening in a swivel piece 69' on a side frame 12 and has on opposite sides of the swivel piece nuts 69².

It should be stated in explanation of this adjustable stop action that cam 63 effects the withdrawal or backward motion of rock arms 62 while the aforesaid spring 63³ causes the forward or feeding action thereof, cam roll 63 riding down the cam surface of decreasing radius until stop 68 operates, whereupon the roll leaves the cam if the movement of the rock arms is arrested before said arms reach the full extremity of the movement for which they are designed. Sometime thereafter the rock arms are brought backward by the continued rotation of the cam.

Coöperative with stops 68 is a projecting stop part 70 on a slide 70' (the purpose of which will presently appear) mounted to move longitudinally of one of the rock arms 62.

For the purpose of withdrawing the printed sheet which, if previously undisturbed, now lies upon the platen feed fingers 61, these latter may be utilized to carry it to a position from which it may be taken for final deposition, thus keeping the upper surface of the sheet during its withdrawal free from contact with any part and which would tend to smear the fresh impression thereon.

It is by this means that the printed sheet indicated and designated by S', is in this instance withdrawn and in order to prevent the printed sheet from sliding off the platen feed fingers when the latter are swung upward and the sheet drawn away from gage pins G they are first lifted somewhat to clear the blank sheet underneath and simultaneously or immediately thereafter moved forward to carry a front hook or stop 70ª on each finger 61 beyond the edge of the printed sheet. This result is here attained by connecting slide 70' by a link 72 with lever 65⁴ and so locating a depressed cam surface 72' on cam 65 that cam rolls 65² will descend thereonto before rock levers 62 begin their backward movement. As a result link 65⁷ is depressed the ends of the platen feed fingers raised, and slide 70' moving downward stop projection 70 is withdrawn from stop 68 and the feed fingers move forward sufficiently to carry hooks 70ª beyond the edge of the printed sheet.

By properly relating and timing the surfaces of motion corrector cam 65 and rock arm cam 63 the ends of the platen feed fingers (the latter now carrying the printed sheet) may be caused during the first stage of their rearward movement, to draw back at an acute angle to the tympan surface, in order to freely disengage the superposed sheet from gage pins G, G. Immediately afterward the rapid descent of link 65⁷ tilts fingers 61 upward, see the upper dotted position in Fig. 10, leaving the platen free to close for an impression.

The printed sheet may be taken off the feed fingers by any suitable means. For instance when they assume their extreme rearward position corresponding to the rearward position of rock arms 65⁷, the fingers still being tilted upward, they may be located between stretcher bars 73 at the opposite ends of each of which is mounted a tape roll 73' carrying an endless tape 73² and which bars supported by frame work 73³ secured to side frames 12 are so located and disposed as permit the entrance of the platen feed fingers without interfering with the sheet at the forward ends of the fingers. These tapes may be driven in a backward direction by a sprocket chain connection 74 connecting driven sleeve 48⁴ with shaft 74' of the rear tape rolls 73'.

When the platen feed fingers rock downward to impinge their sheet engagers against a new sheet, the printed sheet is left on the tapes and is by them conveyed rearwardly, eventually being taken from them by inclined fingers 75 from which they drop and pile upon a support 76 held by brackets 76' mounted on said frames 12, each sheet right side up and in a position in which it may be readily inspected by the pressman. Of course support 76 will ordinarily be shiftable from its sheet-receiving position to facilitate restocking of the elevator, etc.

Where, as in this embodiment, the fresh sheet separated and fed from the pile remains for a time free from the pressure of any feed fingers, that is to say when forwarding tapes are used as in this instance during the time the sheet is on the tapes, such time may be utilized for registering the lateral edge of the sheet. The particular side registering device illustrated comprises a rectangular frame 77 located in the space between the upper and lower stretches of tapes 52 and carrying a number of shafts 78 each so located that friction rolls 78' thereon are situated, as shown in plan view, see Fig. 15, in the space between two contiguous tapes. These friction rolls are rotated so that their upper peripheral portions turn toward the left in said figure (this side being usually employed for side register) as by a worm shaft 79 mounted in the frame 77 and engaging with a worm wheel 79' secured to each shaft 78, the worm shaft being driven by a sprocket and chain connection 80 from the aforesaid tape roll shaft 48'.

Until the tape-carried sheet comes in contact with stop pins 55 the upper peripheral portions of friction rolls 78' remain below the plane of the upper stretches of the tapes, see Fig. 16. While in contact therewith, however, and before the platen feed fingers descend upon the sheet, frame 77 ascends in a direction substantially normal to the plane of the tapes, the upper peripheral portions of the rotating friction rolls 78' are raised above such plane, and the sheet being likewise raised is shifted to the left until its edge strikes a stop 81 previously adjusted to a point in line with the registered position for that edge on the tympan. Thereafter the friction rolls slip upon the sheet until as frame 77 descends, the rolls are moved out of their operative position.

For the purpose of thus shifting the frame it may be mounted upon four substantially parallel crank arms 82, 82, 82, 82, each having a crank pin 82' entering a bearing in the side of the frame and connected in pairs to cross shafts 82² mounted in bearings in the frame extension 12', 12'. These cross shafts are compelled to move in unison by means of a connecting rod 82³ jointed to arms 82⁴, 82⁴, rigid with the shafts. A proper cam 83 on driving shaft 5 serves to actuate the frame, through intervening cam fork 83', cam rolls 83², returning spring 83³, link 83⁴, and arm 83⁵ rigid with one of the cross shafts 82².

In practice occasions arise in which it is desirable to feed the press by hand, the automatic feeding and delivery mechanism being then inoperative and its parts in a position that does not materially interfere with the convenient and necessary hand manipulation of the sheets. In making ready, also, the conditions of inoperativeness of said mechanism and accessibility of the press parts are also called for in practice. To fulfil these conditions the present feeding and delivery mechanism is so mounted as to be capable of being swung in its entirety toward and away from the press from a position, see Fig. 3, in which it leaves the feed board 84 exposed and an open space in front thereof in which the feeder or pressman may stand in an operative position, see Fig. 2. When the sheet elevator is located considerably beyond the platen, as in this case, it is found desirable to give the side frames 12 a parallel motion to the rear and side in order to both open the space in front of the press and still keep clear of the press fly wheel when the parts are swung out.

The specific illustrated means for effecting the result aforesaid comprises a pair of substantially parallel suspension links 85, 85, jointed at their corresponding ends by pivot pins 85', 85' to bracket pieces 86, 86, rigidly secured to a cross beam 87 secured by bolts 87' to the press frame. At their remaining ends pivot pins 85' joint the links to bracket-like extensions 88, 88 rigid with cross bar 15 already referred to as connecting side frames 12, 12.

It is apparent, additionally, that the feed and delivery mechanism movement should be in proper timing with the press movement. In order to not only disconnect driving shaft 5 from operative connection with the press when the mechanism is swung outward and away from the press as already described, but also to assure the inaction of the mechanism until the proper timed relation is established, the following means may be employed:

That is to say, the before-mentioned bevel gear 10 may have a recess in its hub 89 located in the opposite side of the gear face to that from which its aforesaid gear-supporting shaft 66 extends. With this notch there is shown as adapted to engage a driving tooth 90 rigid with a short shaft 90' slidably mounted in the hollow end of the before-mentioned side shaft 8. Shaft 90' is thrust outwardly by a spring 90² while a driving key 90³ is secured to and projects from shaft 90', the key being slidably mounted in a slot 90⁴ in shaft 8.

When, therefore, the feeding and delivery mechanism is swung back into its operative position from its position of non-use, if driving tooth 90, does not come opposite to and seat itself in its counterpart notch, spring 90² will be compressed, the running press causing the driving tooth to slide idly over the end face of hub 89 until the tooth comes opposite to the notch whereupon spring 90² will seat the tooth therein and cause the driving of the mechanism as described.

When the parts are in their operative position as in Fig. 10, their weight is mainly carried by side lugs 91 one on each of the side frames 12, 12, each of the lugs here resting upon an extension 91' of the corresponding feed table bracket 51.

Locking means are indicated in Figs. 7 and 21 for firmly securing the aforesaid mechanism securely to the press when such mechanism is in its operative position. As here illustrated a locking shaft 92 has at each end a catch 92' adapted to enter a corresponding locking notch 92² in the aforesaid bracket extensions 91'. Locking shaft 92 may be provided with a convenient hand lever 92³.

Means are also shown in connection with the locking device for assuring the withdrawal of the platen feed fingers to their extreme position to the rear upon the unlocking of catches 92' thus freely permitting the outward swinging of the parts to their inoperative position, even though the press be stopped with said fingers in a platen-pressing position. Moreover, when the locking device is again actuated to lock the parts, the platen feed fingers are not free to resume their motion until the time arrives in the cycle of movement at which said fingers should be in their rearward position. Thereupon the fingers are freed and permitted to continue their movements.

Referring to Figs. 7 and 21, a pin 93 on a crank arm 93' rigid with one of the rock arms 62 is adapted to play idly back and forth in a slot 93² in a link 93³ hung from catch 92', during the vibratory action of the rock arms already described. When, however, hand lever 92³ is swung to unlock the mechanism from the press the upper end of the slot engages with pin 93 just before the catches are fully clear of the locking recesses 92² and rock arms are brought backward to a point slightly beyond their limit of normal travel. This excess backward movement suffices to engage a spring-pressed detent 94 with a lug 94' on the hub of rock arm 62. The latter remains in this position until the time arrives during the operative movement in which arms 62, 62, would assume the proper position approximating to that in which they are held by detent 94. At such time a projection 94² rotating with driving shaft 5 strikes an arm 130

94³ of the detent, the latter is withdrawn from lug 94' and the rock arms are free to resume their operative motion. During this latter they are never carried far enough back to cause detent 94 to become operative the latter merely pressing against the riding surface of lug 94'. In the illustrated arrangement and proportion of parts the feed board usually supplied with presses of the described type obtrudes in the path of some of the parts. It has therefore been replaced by a feed board 84 having a hinged leaf 84' enabling the latter to be thrown back and provide space for the parts.

The general operation of the foregoing automatic feed and delivery may be briefly described as follows:

Assuming the elevator to have been stocked with the pile of sheets to be printed and the mechanism to have been brought to a position in which platen feed fingers 61 are pressed down upon the edge portion of a registered sheet and the press to have been started, a printed sheet being upon the platen leaf 59 will rock down upon the platen as soon as it approximates to its dwell position. The platen feed fingers then start to slide the blank sheet forward over the surface of the tympan and under the printed sheet to position against the lower gage pins G, G. As soon as the edge of the blank sheet encounters the gage pins, rock arms 62 cease their forward motion, stop projection 70 coming into contact with adjusted stop 68. Sometime thereafter the downward motion of slide 70' will withdraw stop projection 70 from contact with stop 68 and the ends of the platen feed fingers will slightly rise and move forward under the printed sheet to engage the hook 71 with the edge thereof. Platen feed fingers now draw backward and rock upward carrying the printed sheet to a position over the tapes 73². When the fingers rock downward the printed sheet is carried to the place of deposition in a manner readily understood.

In the meantime, pile feed fingers 39 have carried a fresh sheet forward between the sets of gripping rolls 48, 49, and the sheet has been brought down by tapes 52 against raised stop pins 55, the sheet is side registered by the ascent of frame 77 and given the position in which the sheet engagers on the platen feed fingers press against it upon their descent.

Leaf 59 rocks upward clear of the path of the platen and during the backward movement of pile feed fingers 39 above the surface of the pile, jogger fingers 50 shift the displaced sheets back to a common, normal position ready for a fresh separation and feeding. This action is repeated substantially during the continued running of the press.

The action of the pawl 35, and pawl shifter 37 in causing an upward feed of the pile, as well as the action of driving tooth 90 in causing a proper timing to occur if the mechanism is shifted back from an inoperative to an operative position without an immediate reseating of the tooth in its socket, will be readily understood from the foregoing description.

Having described our invention, we claim:

1. In a feed apparatus for a platen press, the combination of a sheet separator and feeder for removing one sheet at a time from a pile thereof, and means for feeding each sheet so removed over the tympan surface and under the sheet which has previously been printed thereon.

2. In a feed apparatus for a platen press, the combination of a sheet separator and feeder for removing one sheet at a time from a pile thereof, and means for sliding each sheet so removed over the tympan surface and under the printed sheet thereon.

3. The combination of a sheet separator and feeder with a sheet registering device and means for sliding the registered sheet onto and over the tympan surface under the printed sheet thereon to its printing position.

4. The combination with a sheet separator and feeder, of mechanism for sliding each sheet in succession onto the tympan surface and over the same under the printed sheet thereon to the printing position determined by the desired location of the gage pins on said surface.

5. In a feed apparatus for a platen press, the combination of a platen feed finger having at one end a sheet engager adapted to engage with the sheet and slide the same over the tympan surface, means for holding the upper edge of the printed sheet on the tympan surface somewhat above said surface, mechanism for reciprocating said finger from a point beyond the platen to a point thereon, and means for bringing a sheet under said sheet engager before the finger begins its forward movement.

6. In a feed and delivery apparatus for a platen press, and in which the delivery of the printed sheet is effected after the fresh sheet is placed upon the tympan surface, the combination of means for sliding the fresh sheet over the tympan surface, and means for holding the upper edge of the printed sheet on said surface somewhat above the same as the sliding sheet approaches and passes under said edge.

7. The combination with fingers provided with sheet engagers adapted to engage a sheet and slide it over the tympan surface of a press to printing position thereon, of means for holding the upper edge of the printed sheet on said surface somewhat above the same as the sliding sheet approaches and passes under said edge, mechanism for withdrawing said fingers with the printed sheet thereon, and means for removing the sheet from the fingers and depositing the same.

8. The combination with fingers adapted to slide a fresh sheet onto the tympan surface under the printed sheet thereon, to a stop position, of means for then raising the fingers free of the fresh sheet and moving them forward for the purpose specified, mechanism for then withdrawing the fingers with the printed sheet thereon, and means for ultimately removing the sheet from the fingers and depositing the same.

9. The combination in an apparatus of the character described of an automatically operative pile elevator, a sheet separator and feeder, reciprocative platen feed fingers adapted during their forward stroke to feed a fresh sheet onto the tympan surface under the printed sheet thereon and during their backward stroke to carry with them the printed sheet, and means for removing the printed sheet from the fingers and depositing the same.

10. The combination in an apparatus of the character described, of an automatically operative pile elevator, a sheet separator and feeder, a sheet register, reciprocative platen feed fingers adapted during their forward stroke to feed a fresh sheet onto the tympan surface under the printed sheet thereon and during their backward stroke to carry with them the printed sheet, and means for removing the printed sheet from the fingers and depositing the same.

11. The combination with a press including a bed, a platen, and means for imparting to the platen a cycle of movement during the former part of which the platen is in printing position and during the latter part of which the platen is in sheet-receiving position, of means for properly positioning the sheet on the platen, and means, coöperating with said positioning means, for feeding sheets to the platen, said feeding means including a sheet-moving member movable from a position clear of the upper edge of the platen lengthwise of the platen toward the lower edge thereof and back again, and means for effecting such movement of said member during the latter part of the platen cycle.

12. The combination with a printing press including a bed, a platen having an abutment thereon, and means for imparting to said platen a cycle of movement during the former part of which the platen is in a printing position and during the latter part of which the platen is in a sheet-receiving position, of means at the rear of said platen, and adjacent the upper edge thereof, for supporting a plurality of sheets, a sheet-moving member movable from a position clear of the upper edge of the platen lengthwise of the platen toward the lower edge thereof and back again, and coöperating with said abutment, and means for imparting the said movement to the said member during the latter part of the cycle of the platen.

13. The combination with a platen printing press, of a frame pivoted adjacent thereto adapted to be swung into or out of operative position with respect to said press, a carriage reciprocating within said frame, radially movable feeder arms carried by the carriage for carrying sheets of paper to and from the platen of the printing press, and means for operating said carriage and adapted to interlock with a necessary operative part of the press when the frame is swung around into operative position.

14. The combination of a platen printing press, of a frame pivoted adjacent thereto adapted to be swung into or out of operative position with respect to said press, a reciprocating carriage within the frame, radially movable reciprocating arms carried by the carriage for conveying sheets of paper to and from the platen printing press, and means operated by the press for operating said arms when the frame is swung into operative position.

15. The combination with a platen printing press, of a frame pivoted adjacent thereto adapted to be swung into or out of operative position with respect to said press, a carriage reciprocating in said frame, radially movable reciprocating feeder arms carried by the frame for conveying the sheets of paper to and from the platen of the press, means for reciprocating said carriage, means for moving the arms radially, said means operated by an operative part of the press when the frame is swung around into operation.

16. The combination with a platen printing press, of a frame pivoted adjacent thereto and adapted to be swung into or out of operative position in respect to said press, a carriage within said frame, radially movable feeder arms carried by the carriage for conveying sheets of paper to and from the platen of the printing press, and means for operating the said carriage and adapted to be interlocked with the necessary operative part of the press when the frame is swung around into operative position.

17. The combination with a platen printing press, of a frame pivoted adjacent thereto and adapted to be swung into or out of operative position with respect to said press, a reciprocating carriage within the frame, arms carried by the carriage for conveying sheets of paper to and from the platen of the printing press and means operated by the press for operating the arms when the frame is swung into operative position.

18. The combination with a press including a bed, a platen, and means for imparting to the platen a cycle of movement during the former part of which the platen is in printing position and during the latter part of which the platen is in sheet receiving position, of means for properly positioning the sheet on the platen, and means, adjustable to accord with the location of said positioning means, for feeding sheets to the platen, said feeding means including a sheet moving member movable from a position clear of the upper edge of the platen lengthwise of the platen toward the lower edge thereof and back again, and means for effecting such movement of said member during the latter part of the platen cycle.

19. The combination with a printing press including a bed, a platen having an abutment thereon, and means for imparting to said platen a cycle of movement during the former part of which the platen is in a printing position and during the latter part of which the platen is in a sheet receiving position, of means at the rear of said platen, and adjacent the upper edge thereof, for supporting a plurality of sheets, a sheet moving member movable from a position clear of the upper edge of the platen lengthwise of the platen toward the lower edge thereof and back again, and adjustable to accord with the location of said abutment, and means for imparting the said movement to the said member during the latter part of the cycle of the platen.

20. The combination with a press including a bed, a platen, and means for imparting to the platen a cycle of movement during the former part of which the platen is in printing position and during the latter part of which the platen is in sheet-receiving position, of feeding means comprising a member for engaging and frictionally pushing a sheet, said member being movable from a position clear of the upper edge of the platen lengthwise of the platen toward the lower edge thereof and back again, and means for effecting such movement of said pushing member during the latter part of the platen cycle.

21. Means for feeding sheets to a platen press, comprising a sheet-moving member, and means for imparting to said member a movement forward over the platen and back again after each impression, part of the forward portion of said movement being substantially parallel with the platen.

22. Means for feeding sheets to a platen press, comprising a sheet-moving member, and means for imparting to said member a movement forward over the platen and back again after each impression, part of the forward portion of said movement being close to the platen and substantially parallel therewith.

23. Means for feeding sheets to a press having a platen movable from a sheet-receiving position to an impression position, comprising a sheet-moving member, and means for imparting to said member a movement forward over the platen and back again while the platen is substantially in its sheet-receiving position, part of the forward portion of said movement being substantially parallel with the platen.

24. Means for feeding sheets to a press having a platen movable from a sheet-receiving position to an impression position, comprising a sheet-moving member, and means for imparting to said member a movement forward over the platen and back again while the platen is substantially in its sheet-receiving position, part of the forward portion of said movement being close to the platen and substantially parallel therewith.

25. The combination with a press including a bed, a platen, and means for imparting to the platen a cycle of movement during the former part of which the platen is in printing position and during the latter part of which the platen is in sheet-receiving position, of feeding means comprising a sheet-moving member, and means for imparting to said member a movement forward over the platen and back again during the latter part of the platen cycle, part of the forward portion of said movement being substantially parallel with the platen.

26. The combination with a press including a bed, a platen, and means for imparting to the platen a cycle of movement during the former part of which the platen is in printing position and during the latter part of which the platen is in sheet-receiving position, of feeding means comprising a sheet-moving member, and means for imparting to said member a movement forward over the platen and back again during the latter part of the platen cycle, a part of the forward portion of said movement being close to the platen and substantially parallel therewith.

27. The combination with a press including a bed, platen, and means for imparting to the platen a cycle of movement during the former part of which the platen is in printing position and during the latter part of which the platen is in sheet-receiving position, of feeding means comprising a sheet-moving member movable from a position out of the path of the platen forward lengthwise of the platen toward the lower edge thereof, a portion of such forward movement being substantially parallel with the platen, and back again, and means for effecting such movement of said member during the latter part of the platen cycle.

28. The combination with a press including a bed, a platen, and means for imparting to the platen a cycle of movement during the former part of which the platen is in printing position and during the latter part of which the platen is in sheet-receiving position, of feeding means comprising a sheet-moving member movable from a position out of the path of the platen forward lengthwise of the platen toward the lower edge thereof, a portion of such forward movement being close to the platen and parallel therewith, and back again, and means for effecting such movement of said member during the latter part of the platen cycle.

29. A device for feeding sheets to a press having a platen movable from a sheet-receiving to an impression position, comprising a sheet engaging and moving member, means for imparting to said member a forward movement over said platen when the latter is substantially in its sheet receiving position, a portion of said movement being substantially parallel with the platen, and means for releasing the engagement of said member with the sheet at a position in the path of such forward movement.

30. A device for feeding sheets to a press having a platen movable from a sheet-receiving to an impression position, comprising a sheet engaging and moving member, means for imparting to said member a forward movement over said platen when the latter is substantially in its sheet receiving position, a portion of said movement being substantially parallel with the platen and close thereto, and means for releasing the engagement of said member with the sheet at a position in the path of such forward movement.

31. A device for feeding sheets to a press having a platen movable from a sheet-receiving to an impression position, comprising a frictional sheet-pusher, and means for imparting to said pusher a forward movement over said platen when the latter is substantially in its sheet receiving position, and means for releasing the engagement of said pusher with the sheet at a position in the path of such forward movement.

32. A device for feeding sheets to a platen press comprising a sheet engaging and moving member, means for imparting to said member after each impression of the press a forward movement over the platen, and then a return movement, a portion of forward movement being in a path substantially parallel with the platen, and means for releasing the engagement of said member with the sheet, said releasing means being adjustable for operation at different positions of said member in the parallel portion of its forward path of movement.

33. A device for feeding sheets to a platen press comprising a sheet engaging and moving member, means for imparting to said member after each impression of the press a forward movement over the platen, and then a return movement, a portion of said movement being close to the platen and in a path substantially parallel therewith, and means for releasing the engagement of said member with the sheet, said releasing means being adjustable for operation at different positions of said member in the parallel portion of its forward path of movement.

34. A device for feeding sheets to a press having a platen movable from a sheet-receiving position to an impression position, comprising a sheet engaging and moving member, means for imparting to said member a forward movement over the platen when the latter is substantially in its sheet-receiving position, a portion of said movement being in a path substantially parallel with the platen, and means for releasing the engagement of said member with the sheet, said releasing means being adjustable for operation at different positions of said member in the parallel portion of its forward path of movement.

35. A device for feeding sheets to a press having a platen movable from a sheet-receiving position to an impression position, comprising a sheet engaging and moving member, means for imparting to said member a forward movement over the platen when the latter is substantially in its sheet-receiving position, a portion of said movement being close to the platen and in a path substantially parallel therewith, and means for releasing the engagement of said member with the sheet, said releasing means being adjustable for operation at different positions of said member in the parallel portion of its forward path of movement.

36. A device for feeding sheets to a press having a platen movable from a sheet-receiving position to an impression position, comprising a sheet-pusher, means for imparting to said pusher a forward movement over the platen when the latter is in its sheet-receiving position, and means for releasing the engagement of said pusher with the sheet, said releasing means being adjustable for operation at different positions of said pusher on the platen.

37. A feeding device for a press having a platen movable from a sheet-receiving to an impression position, comprising a sheet-moving member, means for moving said member over the platen when the latter is substantially in its sheet-receiving position, to deposit a sheet thereon, and means for returning said member in a different path.

38. The combination with a press including a bed, a platen, and means for imparting to said platen a cycle of movement during the former part of which it is in printing position, and during the latter part of which it is in sheet-receiving position, of means for moving said member forwardly over the platen during the latter part of the platen cycle, to deposit a sheet thereon, and means for returning said member in such a path, with respect to the platen, as to clear the sheet previously deposited thereon.

39. The combination with a press including a bed, a platen, and means for imparting to said platen a cycle of movement during the former part of which it is in printing position, and during the latter part of which it is in sheet-receiving position, of means for feeding paper to said press, comprising a sheet-moving member, means for moving said member forwardly over the platen during the latter part of the platen cycle, to deposit a sheet thereon, part of said forward movement being substantially parallel with the platen, and means for returning said member in such a path, with respect to the platen, as to clear the sheet just deposited thereon.

40. The combination with a press including a bed, a platen, and means for imparting to said platen a cycle of movement during the former part of which it is in printing position, and during the latter part of which it is in sheet-receiving position, of means for feeding paper to said press comprising a sheet-moving member, means for moving said member forwardly over the platen during the latter part of the platen cycle, to deposit a sheet thereon, part of said forward movement being substantially parallel with the platen and close thereto, and means for returning said member in such a path, with respect to the platen, as to clear the sheet just deposited thereon.

41. The combination with a press including a bed, a platen, and means for imparting to the platen a cycle of movement during the former part of which the platen is in printing position and during the latter part of which the platen is in sheet-receiving position, of means for feeding paper to said press comprising a sheet engaging and moving member, means for moving said member forwardly over the platen during the latter part of the platen cycle, part of said forward movement being substantially parallel with the platen, means for releasing the engagement of said member with the paper, said releasing means being adjustable for operation at different positions of said member during said parallel portion of its movement, whereby the sheet is deposited at desired positions on the platen, and means for returning said member in such a path, with respect to the platen, as to clear the sheet just deposited thereon.

42. A feeding device for a platen press comprising a sheet-moving member, a pivoted arm supporting said member, means for swinging said arm to move said member over the platen, and means for correcting the movement of said member to cause it to move in a path substantially parallel with the platen.

43. A feeding device for a press having a platen movable from a sheet-receiving to an impression position, comprising a sheet-moving member, a pivoted arm associated with said member to support the same, means for swinging said arm when the platen is substantially in its sheet-receiving position, to move said member forward over the platen, and motion correction means for causing said member to move in a path substantially parallel with the platen.

44. The combination with a press including a bed, a platen, and means for imparting to the platen a cycle of movement during the former part of which the platen is in printing position and during the latter part of which the platen is in sheet-receiving position, of a device for feeding sheets to said press comprising a sheet-moving member, a pivoted arm supporting said member, means for swinging said arm, during the latter part of the press cycle, to move said member over the platen, and motion correcting means for causing said member to move in a path substantially parallel with the platen.

45. A feeding mechanism for a platen press comprising a device reciprocable over the platen and having means for feeding a sheet thereto and for removing the previously printed sheet therefrom.

46. An attachment of the character described, embodying a pile elevator the same embodying means for swinging the attachment including said pile elevator into and out of operative relation with the press, combined with a locking device for locking the attachment in its operative relation aforesaid.

47. The combination of a press, an automatic feed and delivery mechanism, means for operatively connecting the said mechanism with and disconnecting it from the press and means for automatically assuring the proper timing of the mechanism and the press when the former is changed from its inoperative to its operative relation with the press.

48. In an automatically fed printing press, the combination with a support of a pile elevator mounted therein so as to be capable of swinging with respect thereto, to permit access to the press parts.

49. The combination with a platen printing press of feeding device therefor, said feeding device having a portion permanently affixed to said press, and a portion movable with respect to said press, to permit access to the press parts.

50. A feed mechanism embodying a stock carrier having means for shifting the stock to compensate for the removal of sheets, said feed mechanism embodying means for swinging said carrier into and out of operative relation with the press, combined with a locking device for locking said carrier in its operative position aforesaid.

51. A feed mechanism for a printing press comprising a support and a stock carrier, having means for shifting the stock to compensate for the removal of sheets, mounted therein so as to be capable of swinging with respect thereto, to permit access to the press parts.

52. In an automatically fed printing press, the combination with a support, of a stock carrier having means for shifting the stock to compensate for the removal of sheets, said stock carrier being mounted in said support so as to be capable of swinging with respect thereto, to permit access to the press parts, and means for feeding sheets from said stock carrier to the impression member of the press.

53. In an automatically fed printing press, the combination with a support, of a stock carrier having means for shifting the stock to compensate for the removal of sheets, said stock carrier being mounted in said support so as to be capable of swinging with respect thereto into and out of operative relation with the press, to permit access to the press parts, means for feeding sheets from said stock carrier to the impression member of the press, and connection means for actuating said stock shifting means from the press when said stock carrier is in operative position with respect to the latter.

In testimony whereof we have signed our names to the specification in the presence of two subscribing witnesses.

PIERSON L. WELLS.
FREDERICK W. HUNTER.

Witnesses:
M. T. FITZPATRICK,
MAY E. REDDING.